(12) United States Patent
Minear et al.

(10) Patent No.: US 7,113,765 B2
(45) Date of Patent: Sep. 26, 2006

(54) SYSTEM AND METHOD FOR ALLOWING USER BASED APPLICATION LICENSING ACROSS MULTIPLE WIRELESS COMMUNICATIONS DEVICES

(75) Inventors: Brian Minear, San Diego, CA (US); Jason B. Kenagy, San Diego, CA (US); Julie Yu, San Diego, CA (US); Mitchell B. Oliver, San Diego, CA (US); Stephen A. Sprigg, Poway, CA (US)

(73) Assignee: Qualcomm Inc., San Diego, CA (US)

( * ) Notice: Subject to any disclaimer, the term of this patent is extended or adjusted under 35 U.S.C. 154(b) by 179 days.

(21) Appl. No.: 10/756,963

(22) Filed: Jan. 13, 2004

(65) Prior Publication Data

US 2005/0153682 A1 Jul. 14, 2005

(51) Int. Cl.
*H04M 11/00* (2006.01)
(52) U.S. Cl. .................. 455/405; 455/406; 707/10
(58) Field of Classification Search .............. 455/405, 455/406, 407, 408, 414.3; 707/203, 10, 205; 709/223, 226; 711/151
See application file for complete search history.

(56) References Cited

U.S. PATENT DOCUMENTS

| 6,105,057 | A | * | 8/2000 | Kuftedjian et al. | 709/213 |
| 6,115,613 | A | * | 9/2000 | Jonsson | 455/519 |
| 6,134,591 | A | * | 10/2000 | Nickles | 709/229 |
| 6,246,430 | B1 | * | 6/2001 | Peters et al. | 348/14.01 |
| 6,832,230 | B1 | * | 12/2004 | Zilliacus et al. | 707/203 |

FOREIGN PATENT DOCUMENTS

EP          1130495          5/2001

* cited by examiner

*Primary Examiner*—Melur Ramakrishnaiah
(74) *Attorney, Agent, or Firm*—Philip R. Wadsworth; Robert J. O'Connell; Christopher S. Chow

(57) ABSTRACT

A system and method for a wireless service provider to provide activation of an application by a subscriber who has a plurality of wireless communications devices in a single subscription account. The subscriber can access the application from any one of the wireless communications devices, but only one activation at a time is allowed for each subscription account.

17 Claims, 9 Drawing Sheets

| User Account Info (user id) | Application identification | Device identification | Device identification | current device id | password |
|---|---|---|---|---|---|
| user1 | product1 | device1 | device2 | - | psw1 |
| user1 | product2 | device1 | device3 | device1 | psw2 |
| user2 | product1 | device4 | device5 | device5 | psw3 |

Fig. 2

| User Account Info (user id) | application identification | in-use | password |
|---|---|---|---|
| user1 | application1 | free | psw1 |
| user1 | application2 | yes | psw2 |
| user2 | application3 | yes | psw3 |

Fig. 9

SYSTEM AND METHOD FOR ALLOWING USER BASED APPLICATION LICENSING ACROSS MULTIPLE WIRELESS COMMUNICATIONS DEVICES

BACKGROUND

1. Field

The present invention generally relates to wireless telecommunications and computer networks. More specifically, the present invention relates to a system and method for providing an infrastructure for service providers to deliver services to a subscriber having multiple wireless communications devices.

2. Description of the Related Art

Technology advancement has made mobile telephones, or wireless communications devices, cheap and affordable by almost everyone. It is not uncommon for a family to own several wireless communications devices, one for each family member. Wireless service providers have also made it easier for plurality of wireless communications devices to bill to a single subscription account. Some wireless service providers allow different wireless communications devices to share a time allotment assigned to a single user account. For example, a user can sign up for a plan that allows 500 minutes of airtime and have this 500 minutes shared by different wireless communications devices used by the family members.

In the above situation, multiple wireless communications devices used by different family members do not compete for the 500 minutes time allotment. Instead, the wireless service provider records airtime used by each wireless communications device and totals the time used by all the wireless communications devices in the same user account. The total time is then compared with the 500 minutes time allotment. There is no limitation on the amount of time that each individual wireless communications device can be used.

However, the situation changes when the wireless service provider charges a monthly subscription fee or an access fee per user per wireless device application. For certain applications, the wireless service providers may require a fixed subscription fee per wireless communications device, and a user needs to subscribe to the application and pay a monthly subscription fee before being allowed to access the application from the wireless communications device. But, paying a subscription fee per wireless communications device becomes expensive if the user wants to access the same application through different wireless communications devices, as in the situation of a family having several wireless communications devices. Paying a subscription fee per wireless communications device also becomes expensive if the user wants to make the application, such as a wireless web-based yellow page service, that is usually accessed sporadically, to all family members. It is unlikely all family members will access the wireless web-based yellow page service simultaneously, thus, paying a subscription fee per wireless communications device becomes economically disadvantageous for the user.

Accordingly, it would be advantageous to provide a system and method that allows wireless service providers to grant access to an application from any wireless communications devices registered in a user account. It is thus to such a system and method that the present invention is primarily directed.

SUMMARY OF THE INVENTION

The present invention discloses a system and method that allow a wireless service provider to charge a single subscription fee per subscription account to access a wireless application, wherein there are multiple wireless communications devices associated with the single subscription account. The present invention permits the wireless service provider to control access to the wireless application, so that only one wireless communications device can activate the wireless application at a time. Thus, simultaneous access requests from different wireless communications devices associated with the single subscription account are denied.

A method, according to one embodiment of the present invention, permits the wireless service provider to support a subscriber with a plurality of wireless communications devices, wherein the wireless service provider charges a single subscription fee per subscriber for a service and permits the service be invoked singularly through a plurality of wireless communications devices. The method may include the following steps: receiving a selection for a selected application from the plurality of wireless communications devices, sending the selected application to the plurality of wireless communications devices, recording information of the selected application and the plurality of wireless communications devices in a subscription table, receiving an activation request for the selected application from a requesting wireless communications device, checking availability of the selected application in the subscription table, and, if the selected application is available, marking the selected application as unavailable and sending an activation to the requesting wireless communications device.

A system according to one embodiment of the present invention allows a wireless service provider to support a subscriber with a plurality of wireless communications devices, wherein the wireless service provider charges a single subscription fee for a service and permits the service be invoked singularly through a plurality of wireless communications devices. The system may include a mobile switching center in communication with a plurality of wireless communications devices, wherein the plurality of wireless communications devices have same subscriber information, and a server in communication with the mobile switching center, that has a subscription table, with a plurality of entries. Each entry of the subscription table may have a subscriber identification field, an application identification field, and a plurality of device identification fields, wherein each device identification field stores information on one wireless communications device.

BRIEF DESCRIPTION OF THE DRAWINGS

Other objects, advantages, and features of the present invention will become apparent after review of the hereinafter set forth Brief Description of the Drawings, Detailed Description of the Invention, and the Claims:

FIG. 2 illustrates a subscription table.

FIG. 9 illustrates a subscription table according to an alternate embodiment.

DETAILED DESCRIPTION OF THE INVENTION

In this description, the terms "communication device," "wireless device," "hand held telephone," "wireless communications device," and "handset" are used interchangeably, the term "application" as used herein is intended to encompass executable and nonexecutable software files, raw data, aggregated data, patches, and other code segments. Further, like numerals refer to like elements throughout the several views. With advent of $3^{rd}$ generation (3G) wireless communication technology, more bandwidth becomes available for wireless communications, and handsets and wireless telecommunication devices, such as cellular telephones, pagers, personal digital assistants (PDAs) have increasing wireless capabilities. Now, wireless service providers can offer a variety of applications that can provide different services to their subscribers. These applications allow a user to check weather, check stock quotes, check latest news bulletins, receive e-mails, receive paging messages, traverse the Internet, and play an interactive game with a remote party all through his wireless handset, in addition to using it for maintaining audio communications with another party. Many of these applications are used sporadically by the user, i.e., the user may invoke an application for a short period of time and not run the application for hours each day, and the user is still charged-a full monthly subscription fee. For this reason, the user may be reluctant to sign up for the service. However, the user may be more inclined to sign up for the service if he can pay a single subscription fee per application and is able to share the access to the application with his family members who use different wireless communications devices. The present invention thus provides support for wireless service providers to generate more revenues by allowing a user to pay a single subscription for an application and to access the application from a plurality of wireless communications devices as is further described herein.

Figure 1:
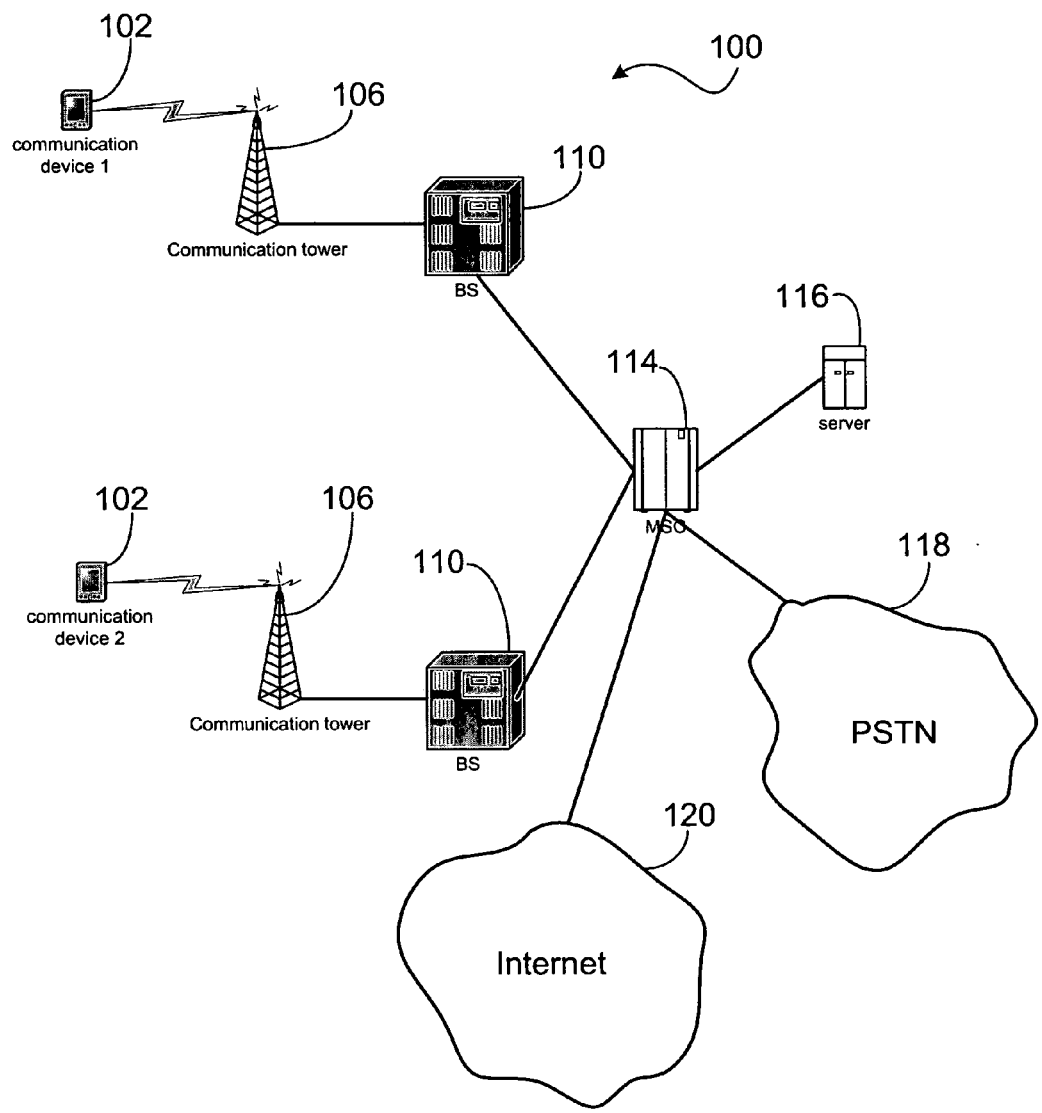
FIG. 1 is a system diagram depicting an embodiment of telecommunication system that supports control application access by a plurality of wireless devices.

FIG. 1 depicts a communication network 100 used according to the present invention. The communication network 100 includes one or more communication towers 106, each connected to a base station (BS) 110 and serving users with communication devices 102. The communication devices 106 can be cellular telephones, pagers, personal digital assistants (PDAs), laptop computers, or other handheld, stationary, or portable communication devices that use a wireless and cellular telecommunication network. The commands and data input by each user are transmitted as digital data to a communication tower 106. The communication between a user using a communication device 102 and the communication tower 106 can be based on different technologies, such code division multiplexed access (CDMA), time division multiplexed access (TDMA), frequency division multiplexed access (FDMA), the global system for mobile communications (GSM), or other protocols that may be used in a wireless communications network or a data communications network. The data from each user is sent from the communication tower 106 to a base station (BS) 110, and forwarded to a mobile switching center (MSC) 114, which may be connected to a public switched telephone network (PSTN) 118 and the Internet 120.

The MSC 113 may be connected to a server 116 that supports different applications available to subscribers using the wireless communications devices 102. Optionally, the server 116 may be part of the MSC 113.

The server 116 may be operated by the wireless service supplier or a third party. The server 116 provides applications that can be invoked by wireless subscribers. The server 116 also maintains a subscription table 200 as illustrated by FIG. 2. The subscription table 200 records identities of user accounts 202 that subscribe to the applications, identifications of the applications subscribed 204, identities of wireless devices authorized to access the application 206, 208, identity of the wireless communications device currently invoking the application 210, and the password associated with the application 211. Preferably, there is one entry per application 212. When a user subscribes for more than one application, the user's account information will show up in more than one entry 212.

When a user subscribes to an application, an entry is created for the account. The entry lists the user's account information 202, which can be used as that user's identification information, and the application 204. Alternatively, the user can also use a login name or a user name as that user's identification information. If there are many wireless devices listed in the account, such as in a family situation when each family member has a wireless device, the user may list the identities of the wireless devices authorized to use the application. The user may authorize all, or only subset, the devices to use the application. The user may also assign a password for this application. After the wireless service provider creates the entry, the wireless service provider forwards the user information to a billing system so the user can be billed.

Figure 3:
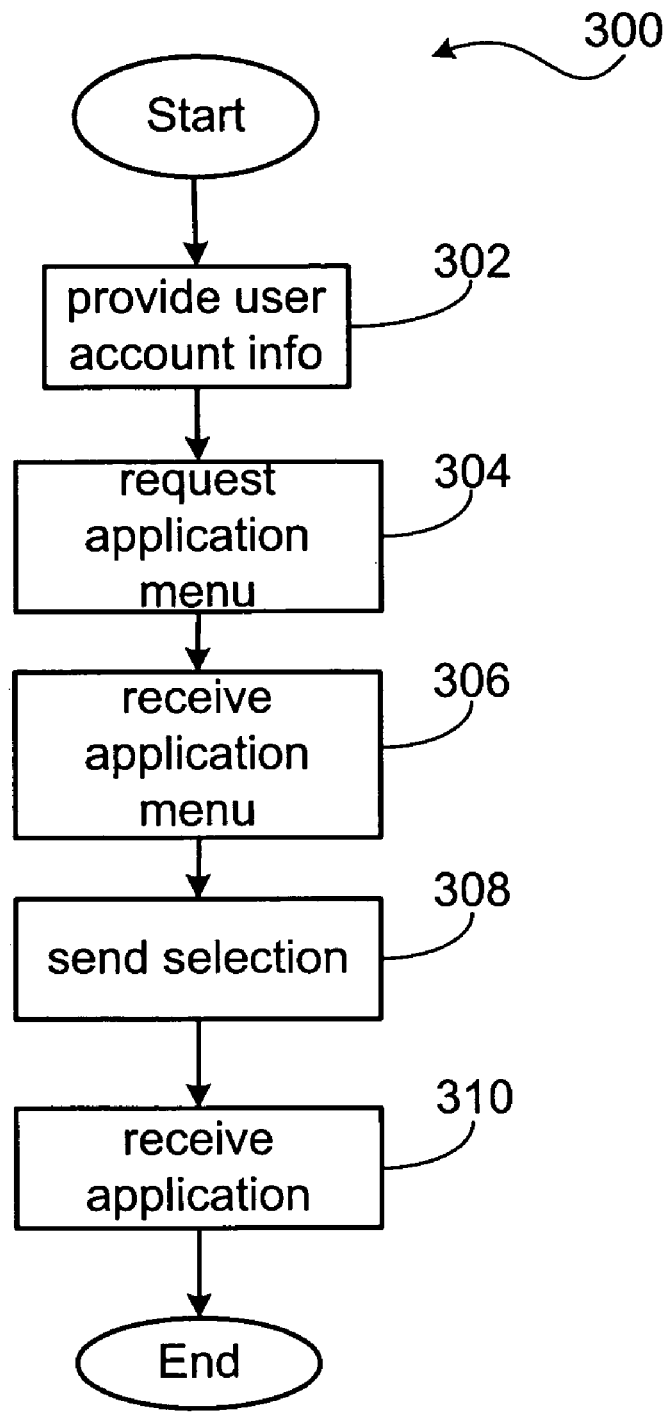
FIG. 3 is a flowchart illustrating a user subscription process.

FIG. 3 illustrates a user subscription process 300. A user subscribes to an application by providing his account information to the service provider, step 302. The service provider of the application may be the same wireless service provider who provides the wireless services to the user or an independent third party. The user account information is associated with his mobile identification number (MIN) or his wireless device's electronic identification number (EIN).

The wireless service provider can easily retrieve his account information from its database using MIN/EIN and forward to the third party service provider if needed. The user makes a request for a menu of applications, step 304, and receives the menu, step 306. Both the request and the menu are transmitted wirelessly between the wireless handset 102 and the communication tower 106. The menu is displayed on the wireless handset 102 from where the user can make a selection. After selecting an application, the wireless handset 102 sends the selection to the wireless service provider, step 308, and receives the application from the wireless service provider, step 310. The application received may be a full application that runs on the wireless handset 102 or a remote user interface for the application that runs on the server 116.

The user may also enter information of other wireless handset 102 that are allowed to access the application. This can be done by entering information of each wireless handset or by selecting from a list received from the wireless service provider.

Figure 4:
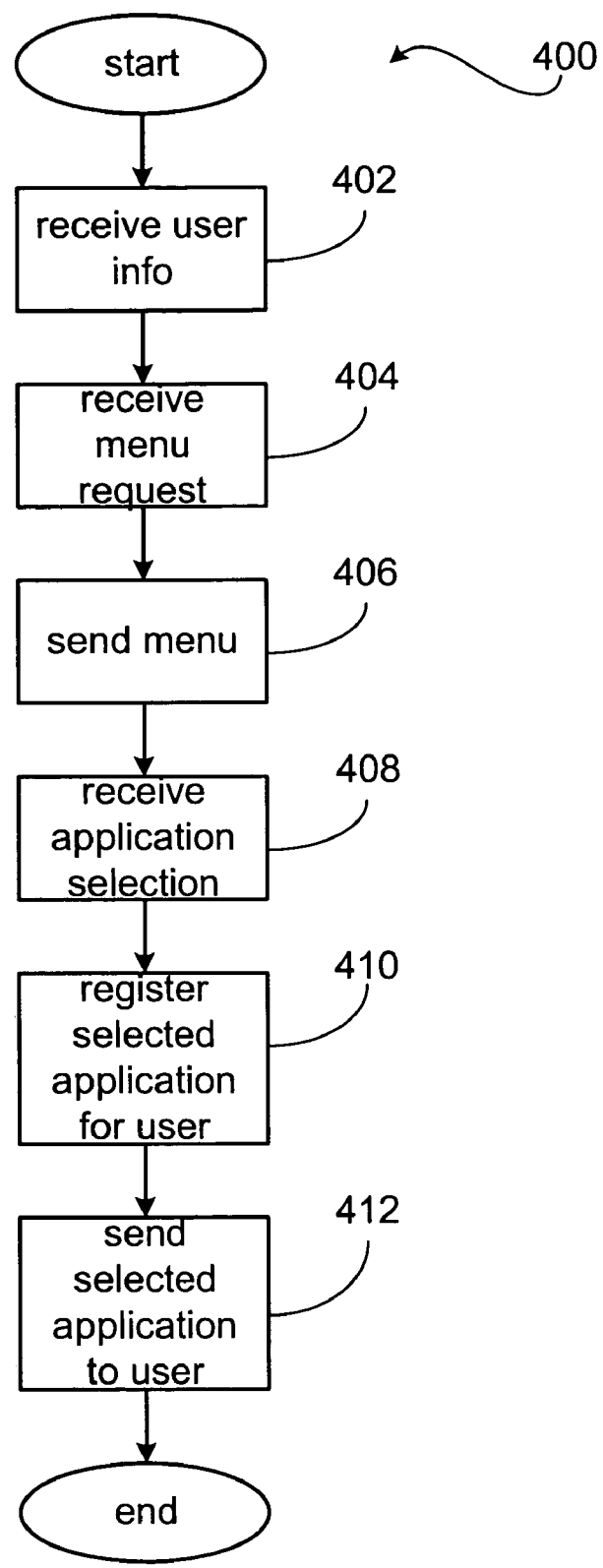
FIG. 4 is a flowchart illustrating a wireless service provider subscription process.

FIG. 4 illustrates a wireless service provider subscription process 400. The wireless service provider receives the user information, step 402, when the user registered with the wireless service provider. The wireless service provider receives the menu request, step 404, and transmits the menu to the user's wireless communication device 102, step 406. After the wireless service provider receives the selection, step 408, the wireless service provider creates an entry 212 in the subscription table 200 and registers the user account information 202, application selected 204, and devices allowed to access the application, step 410. After registering the selected application, the wireless service provider sends the selected application to the user, step 412. Optionally, the user can set a password for the application, and the password will also be entered into the entry 212.

In an alternate embodiment, the user may repeat the subscription process from different wireless communications devices so the application may be downloaded to those wireless communications devices. However, in this case no new entries are created in the subscription table, and the wireless service provider will simply add the identification of the wireless communications device into the proper entry.

Figure 5:
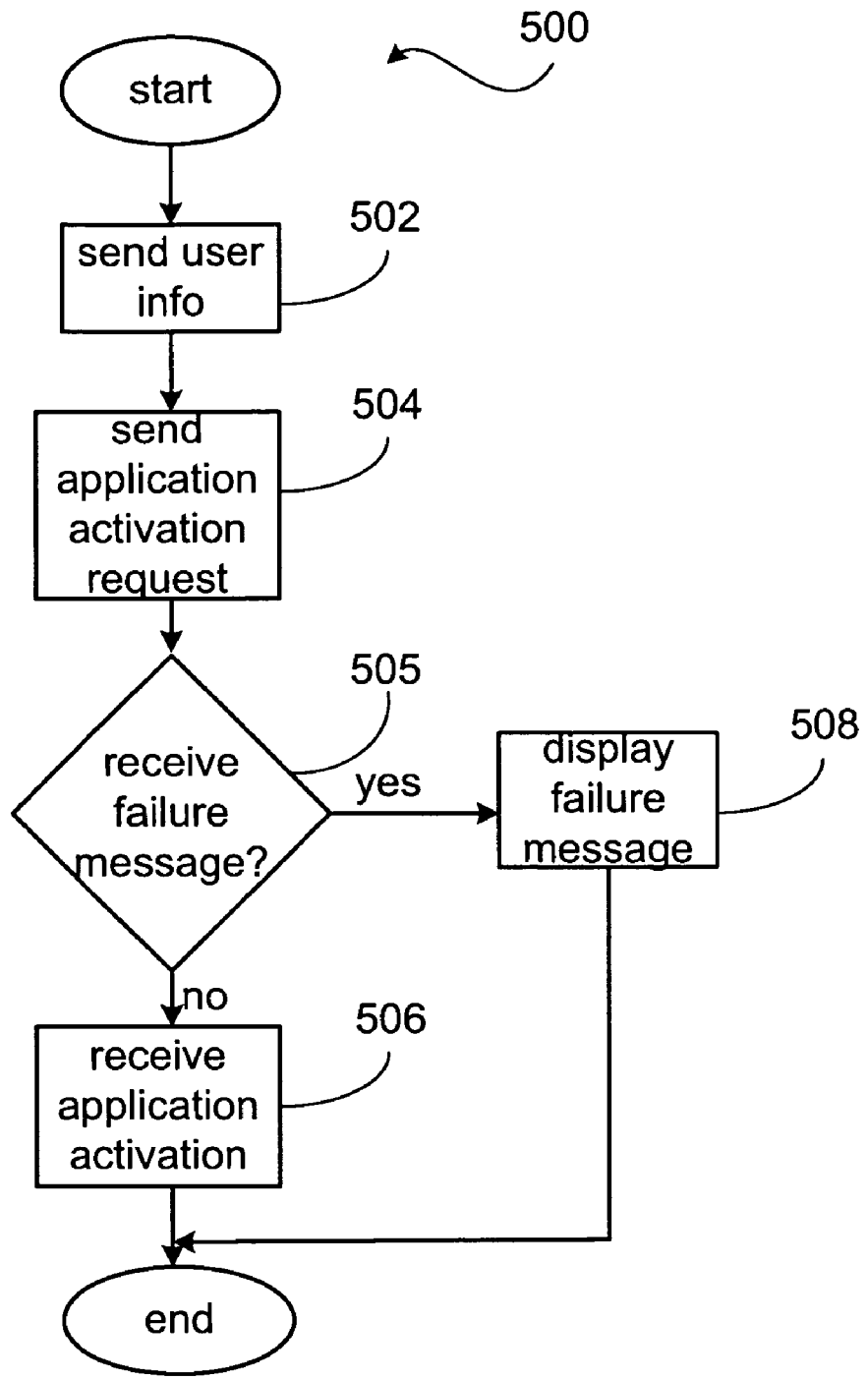
FIG. 5 is a flowchart illustrating a user application activation process.

FIG. 5 illustrates a user activation process 500. The user sends its information to the wireless service provider, step 502, when the wireless communications device 102 registers with the wireless service provider. After the wireless communications device 102 is in communication with the wireless service provider, the user can activate the application by sending an application activation request to the wireless service provider, step 504. If no failure message is received, step 505, then the wireless communications device will receive an activation for the selected application, step 506. The activation may be an authorization from the wireless service provider that allows the wireless communications device to run the remote user interface. The activation may also be the entire application being received by the wireless communications device. If the wireless communications device receives a failure message instead of the activation, the wireless communication device displays the failure message, step 508.

Figure 6:
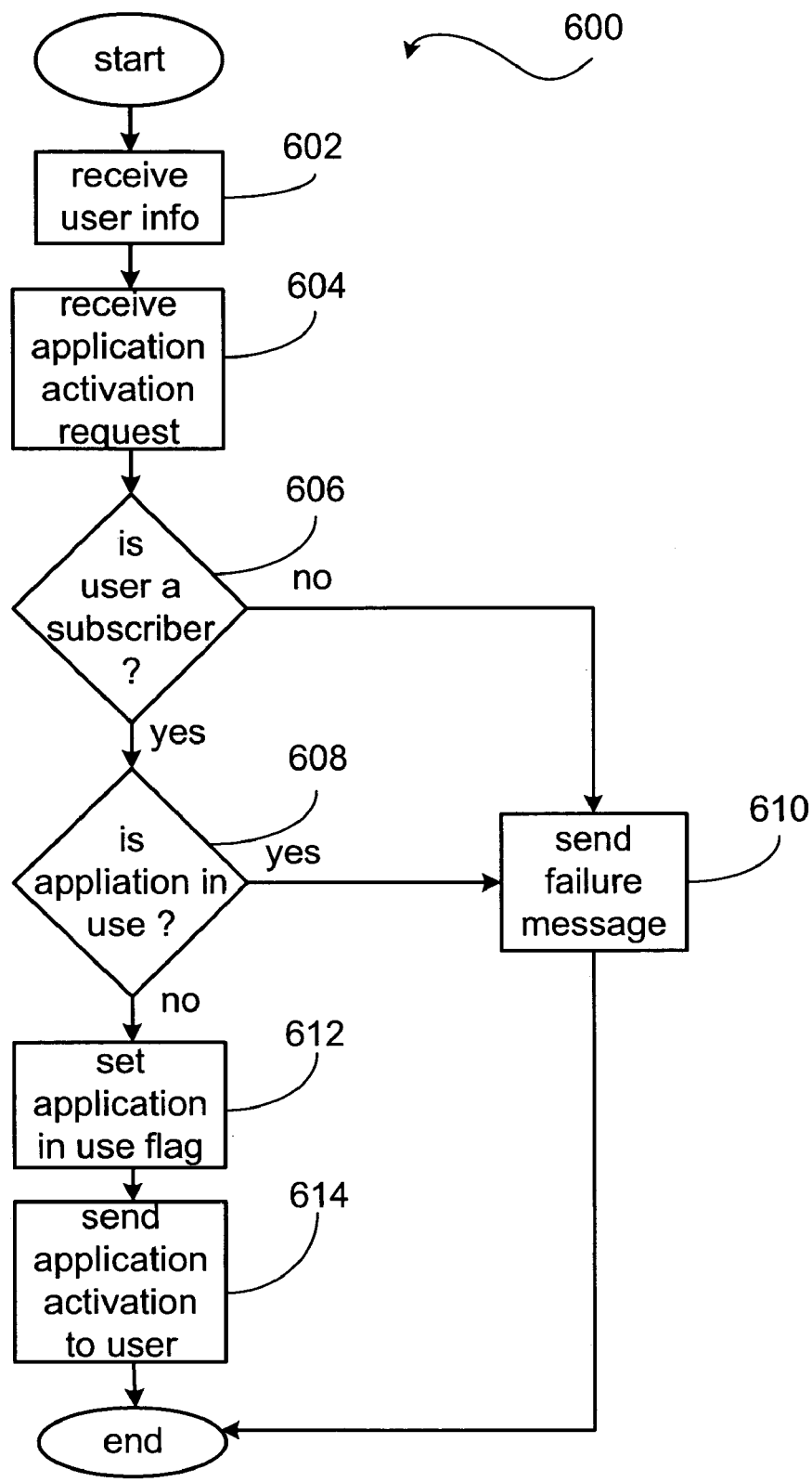
FIG. 6 is a flowchart illustrating a wireless service provider application activation process.

FIG. 6 illustrates a wireless service provider subscription process 600. The wireless service provider receives the user information during the registration procedure, step 602, and an activation request for an application, step 604. The user information may also be a user name provided by the user. The wireless service provider checks the subscription table 200 to see if the user is a subscriber, step 606. If the user is not a subscriber, then the wireless service provider sends a failure message to the user, step 610. If the user is a subscriber, then the wireless service provider checks if the selected application is in use by other wireless communications device, step 608. If the application is being used by another wireless communications device in the user's account, for example, used by a spouse, then the wireless service provider sends a failure message to the user, step 610. If the selected application is not in use, the wireless service provider sets "in-use" flag in the entry in the subscription table for the application, step 612, and sends the selected application activation to the user, step 614. Setting the "in-use" flag may be accomplished by entering the identification of the wireless communications device into the current device identification field 210.

Figure 7:
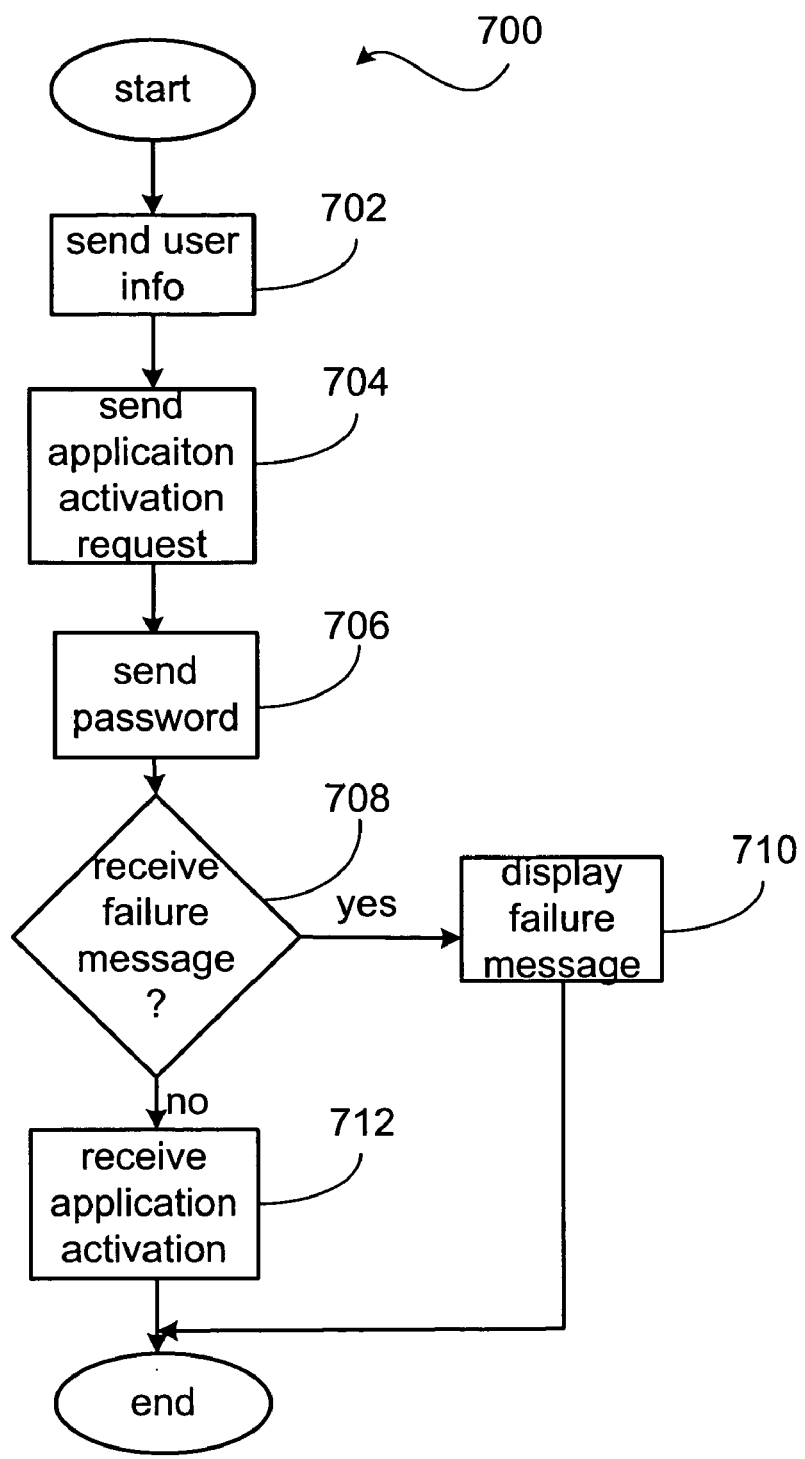
FIG. 7 is a diagram illustrating a user application activation process according to an alternate embodiment.

FIG. 7 illustrates an alternate embodiment for a user activation process 700. The process 700 is similar to process 500 except for password submission. The user sends its information to the wireless service provider, step 702, when the wireless communications device 102 registers with the wireless service provider. After the wireless communications device 102 is in communication with the wireless service provider, the user can activate the application by sending an application activation request, step 704, and a password, step 706, to the wireless service provider. If no failure message is received, step 708, then the wireless communications device will receive an activation for the selected application, step 712. If the wireless communications device receives a failure message instead of the activation, the wireless communication device displays the failure message, step 710.

Figure 8:
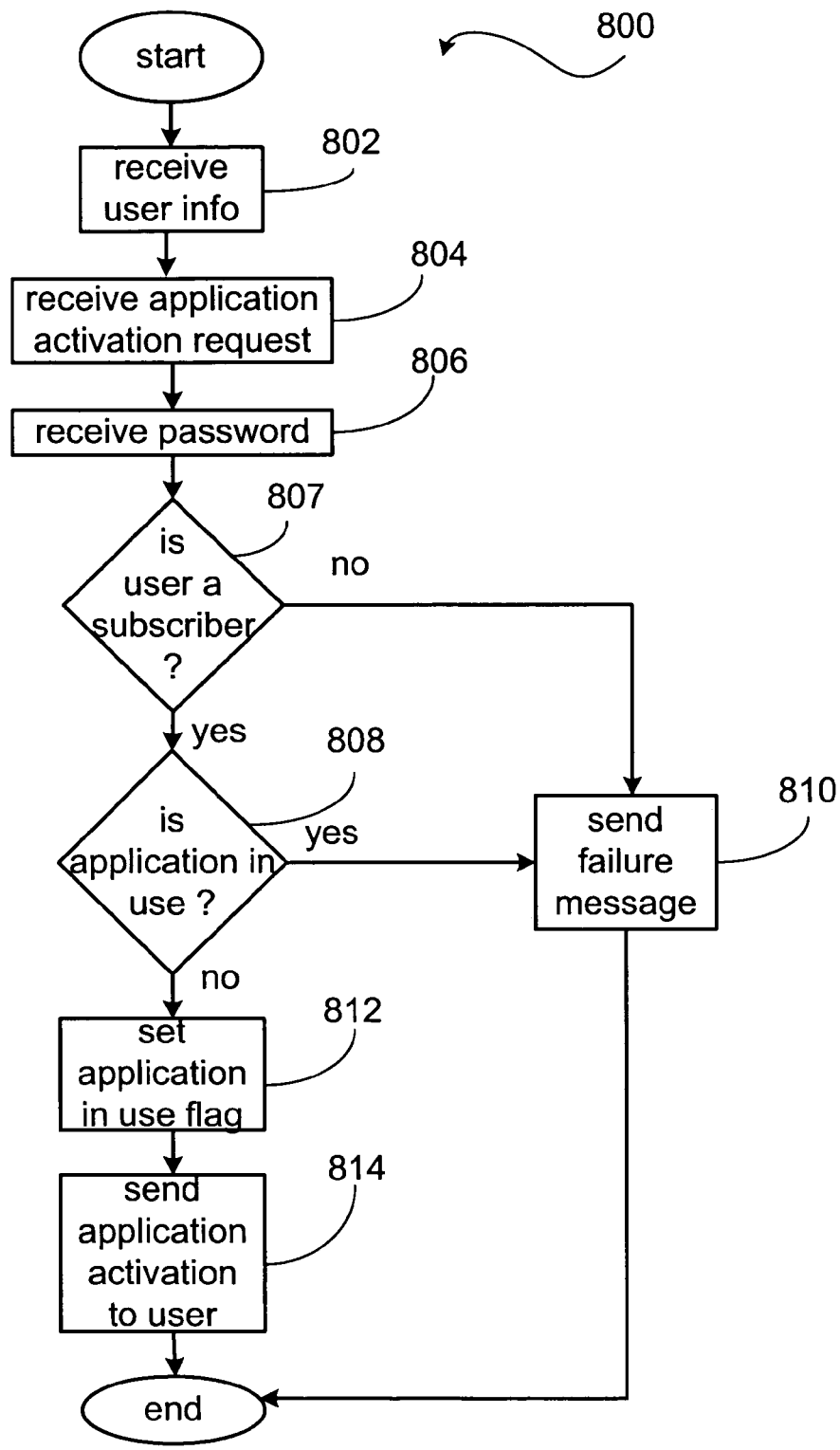
FIG. 8 is a flowchart illustrating a wireless service provider application activation process according to an alternate embodiment.

FIG. 8 illustrates an alternate embodiment for a user activation process 800. The process 800 is similar to process 600 except for receiving a password. The wireless service provider receives the user information during the registration procedure, step 802, and an activation request for an application, step 804. The wireless service provider also receives a password from the user, step 806. The wireless service provider checks the subscription table 200 to see if the user is a subscriber, step 807, and if the password provided is correct. If the user is not a subscriber or an authorized user, then the wireless service provider sends a failure message to the user, step 810. If the user is a subscriber, then the wireless service provider checks if the selected application is in use by other wireless communications device, step 808. If the application is being used by another wireless communications device in the user's account, for example, used by his spouse, then the wireless service provider sends a failure message to the user, step 810. If the selected application is not in use, the wireless service provider sets "in-use" flag in the entry in the subscription table for the application, step 812, and sends the selected application activation to the user, step 814.

In an alternate embodiment, the wireless service provider may allow a user to access an application from not only wireless communications devices attached to his user account, but from any wireless communications device. FIG. 9 illustrates a subscription table 900 for this alternate embodiment. The wireless service provider records in the subscription table 900 the user account information 902 and the application identification 904 in an entry 910. In the same entry 910, the wireless service provider can also record the password 908 to invoke the application and the identification of wireless communication device currently using the application 906. According to this embodiment, the user or his family member can invoke the application from any wireless communications device. When the user connects to the wireless service provider, he can make a request for the application. The wireless service provider prompts him to enter his user account information, such as his user name, and the password. If the user account information and the password entered are correct, the wireless service provider sends the application or its activation to the user if there is no one from the user's account using the application.

In yet another embodiment, the wireless service provider may allow a user to subscribe to a certain number of licenses for personal and use by family members. In this embodiment, the entries in the subscription table will have an active user number field and a predefined user number field. The user may elect to subscriber two licenses, for example, of a particular application, and the wireless service provider will allow the application be invoked simultaneously by up to two wireless communications devices associated with the user's account. A third simultaneous activation for the same application would fail.

The following is a description of one use scenario according to one embodiment of the present invention. A user may purchase a wireless device having a device resident operating system, such as a Binary Runtime Environment for Wireless (BREW™) enabled device, and subscribe to a wireless communications service with a provider. The user also subscribes to a Global Positioning System (GPS) based navigation service from his wireless service provider, and registers with the wireless service provider multiple wireless communications devices used by his family members. The wireless service provider allows the user to download the application to the wireless communications devices owned by him and his family members. The wireless service provider creates an entry for the user in the subscription table and lists the application in the entry. The wireless service provider also records the identification of each wireless communications device in the subscription table. For security purpose, the wireless service provider may allow the user to set a password for the application.

The user can invoke the application to help him to drive from his office to his client site. The user makes a call to the wireless service provider to activate the application. The wireless service provider obtains the identification information for the user's wireless communications device when user's device registers with the wireless service provider and retrieves user's account information from its record. The wireless service provider uses the user account information and the application information to retrieve an entry from the subscription table. If the entry has a password, the wireless service provider prompts the user for the password. After verifying the password, the wireless service provider checks if the application is in use. If the application is not in use, the wireless service provider enters the user's wireless communications device's identification in the entry and sends the activation to the user. After the user finishes using the application, the user releases the application, which can be a hang up signal to the wireless service provider, and the wireless service provider clears the user's device from the entry. If another family member calls the wireless service provider to activate the same application while the user is using it, the wireless service provider sends an "in-use" message to the calling device.

In an alternative embodiment, the invention may be implemented in such way to increase revenues for service providers. For example, for a subscriber using wireless devices equipped with a removable user identification module (RUIM), a service provider may permit the subscriber to download an application to different devices if the devices are fitted with the subscriber's RUIM. Generally, a RUIM's serial number or a subscriber identification number (SID) are used to identify a subscriber and the RUIM's serial number and SID are stored in a server. When the subscriber inserts his RUIM into a wireless device and requests download of an application to this wireless device, the server checks the RUIM serial number received from the wireless device against a database of subscribers. After recognizing the RUIM as belonging to a subscriber, the server proceeds to download the application to the wireless device. The service provider may choose to charge a fee for downloading the application to this additional wireless device.

The following is a use scenario for the above embodiment. A subscriber of a video game downloaded the video game to his primary handset and used this handset for playing the video game. However, if the subscriber is without his primary handset but with his RUIM, he can still play the video game by using a different handset. He can insert his RUIM into this handset and proceeds to download the application to this handset. The handset transmits the serial number of the RUIM along with the handset information to the server, which checks for his subscription through the RUIM's serial number. After confirming his subscription, the server sends the video game to this handset, and records a charge for this download. As described above, the service provider can place additional charges for downloading the application to a handset other than his primary handset.

The BREW™ enabled wireless devices provide to a service provider the options of either billing application downloads per SID/RUIM per device or per SID/RUIM only. A BREW™ enabled device provides to a server device and/or application information that enables the service provider charges the user either per application download or per application download per device.

In view of the method being executable on a wireless service provider's computer device or a wireless communications device, the present invention includes a program resident in a computer readable medium, where the program directs a server or other computer device having a computer platform to perform the steps of the method. The computer readable medium can be the memory of the server, or can be in a connective database. Further, the computer readable medium can be in a secondary storage media that is loadable onto a wireless communications device computer platform, such as a magnetic disk or tape, optical disk, hard disk, flash memory, or other storage media as is known in the art.

In the context of FIGS. 3–8, the method may be implemented, for example, by operating portion(s) of the wireless network to execute a sequence of machine-readable instructions, such as wireless communications device or the server. The instructions can reside in various types of signal-bearing or data storage primary, secondary, or tertiary media. The media may comprise, for example, RAM (not shown) accessible by, or residing within, the components of the wireless network. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog transmission media.

While the invention has been particularly shown and described with reference to a preferred embodiment thereof, it will be understood by those skilled in the art that various changes in form and detail maybe made without departing from the spirit and scope of the present invention as set for the in the following claims. Furthermore, although elements of the invention may be described or claimed in the singular, the plural is contemplated unless limitation to the singular is explicitly stated.

What is claimed is:

1. A method for a wireless service provider to enforce singularly invoking of an application when the wireless service provider charges a subscriber a single subscription fee for use of an application and permits the application to be invoked singularly through one of a plurality of wireless communications devices each associated with the subscriber, comprising the steps of:
    receiving a selection for a selected application from at least one of the plurality of wireless communications devices;
    sending the selected application to at least one of the plurality of wireless communications devices;
    recording information regarding a use status of the selected application over the plurality of wireless communications devices;
    receiving an activation request for the selected application from a requesting wireless communications device;
    checking whether the selected activation is in use over the plurality of wireless communications devices;
    if the selected application is in use, sending a failure message to the requesting wireless communications device, thereby causing the requesting wireless device to not execute the selected application; and
    if the selected application is not in use, recording the selected application as being in use on the requesting wireless communication device, and sending an activation to the requesting wireless communications device, thereby permitting the requesting wireless device to execute the selected application.

2. The method of claim 1, further comprising:
    associating subscriber information with the information of the selected application and the plurality of wireless communications devices in a subscription table.

3. The method of claim 2, further comprising:
    providing a subscription table in a server.

4. The method of claim 3, wherein the server is a remote server.

5. The method of claim 2, further comprising:
    receiving subscriber information from the requesting wireless communications device.

6. The method of claim 5, further comprising:
    checking the subscriber information against information in the subscription table.

7. The method of claim 1, further comprising:
    verifying that the requesting wireless communications device belongs to the subscriber.

8. The method of claim 1, further comprising:
    sending an application menu to the plurality of wireless communications devices.

9. The method of claim 1, further comprising:
    receiving information about the requesting wireless communications device.

10. The method of claim 1, further comprising:
    receiving a password from the requesting wireless communications device.

11. The method of claim 10, further comprising:
    checking the password against information in the subscription table.

12. The method of claim 1, further comprising:
    receiving a user name.

13. A system for enforcing singularly invoking of an application when a wireless service provider charges a subscriber a single subscription fee for use of an application and permits the application to be invoked singularly through one of a plurality of wireless communication devices each associated with the subscriber, comprising:
    a mobile switching center in communication with the plurality of wireless communications devices, wherein the plurality of wireless communications devices have same subscriber information;
    a server in communication with the mobile switching center, the server having a subscription table, wherein the subscription table has a plurality of entries, each entry having
        a subscriber identification field,
        an application identification field, and
        a plurality of device identification fields, wherein each device identification field stores information about one wireless communications device, and
        a current device field;
    wherein
    the server records a subscriber identification corresponding to the subscriber in the subscriber identification field,
    the server record an application identification corresponding to the application in the application identification field,
    the server records in the plurality of device identification fields device identifications each respectively associated with the plurality of wireless communication devices,
    the server records in the current device field which of the plurality of wireless communication devices, if any, is executing the application, and upon receiving an activation request for the application from a specific one of the plurality of wireless communication devices, the server checks the current device field to determine whether the application is in use over the plurality of wireless communications devices, and if the application is in use, the server sends a failure message to the specific one of the plurality of wireless communications devices, thereby preventing the specific one of the plurality of wireless communications devices from executing the application, and if the application is not in use, the server records the specific one of the plurality of wireless communication devices as using the application, and sends an activation message to the specific one of the plurality of wireless communications devices, thereby enabling the application to be executed by the specific one of the plurality of wireless communication devices.

14. The system of claim 13, wherein the subscription table further comprising a password field.

15. A method for invoking singularly invoking of an application when a wireless subscriber is charged a single subscription fee for use of an application and permits the application to be invoked singularly through one of a plurality of wireless communications devices each associated with the subscriber, comprising:

receiving an activation request for the application from one of the plurality of wireless communications devices;

determining if the application is in use over the plurality of wireless communications devices;

if the application is in use, sending a failure message to the requesting wireless communication device, thereby causing the requesting wireless device to not execute the application; and if the application is not in use, sending an activation message to the requesting wireless communications device, thereby permitting the requesting wireless device to execute the application.

16. The method of claim 15, further comprising:

receiving a password from each of wireless communications devices; and verifying the password.

17. A computer readable medium tangibly storing a sequence of instructions forming a program, which when executed by a computer, causes the computer to perform a sequence of steps enforcing singularly invoking of an application upon which a wireless subscriber is charged a single subscription fee for use of the application singularly invoked through one of a plurality of devices, each device associated with the subscriber, the sequence of steps comprising:

receiving an activation request for the application from one of the plurality of wireless communications devices;

determining if the application is in use over the plurality of wireless communications devices;

if the application is in use, sending a failure message to the requesting wireless communication device, thereby causing the requesting wireless device to not execute the application; and if the application is not in use, sending an activation message to the requesting wireless communications device, thereby permitting the requesting wireless device to execute the application.

* * * * *